US011685817B2

(12) United States Patent
Courtemanche et al.

(10) Patent No.: US 11,685,817 B2
(45) Date of Patent: Jun. 27, 2023

(54) BRIDGED FRUSTRATED LEWIS PAIRS AS THERMAL TRIGGER FOR REACTIONS BETWEEN SI-H AND EPOXIDE

(71) Applicant: Dow Silicones Corporation, Midland, MI (US)

(72) Inventors: Marc-Andre Courtemanche, Midland, MI (US); Eun Sil Jang, Columbus, OH (US); Yanhu Wei, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 81 days.

(21) Appl. No.: 17/601,729

(22) PCT Filed: Jun. 2, 2020

(86) PCT No.: PCT/US2020/035645
§ 371 (c)(1),
(2) Date: Oct. 6, 2021

(87) PCT Pub. No.: WO2020/247338
PCT Pub. Date: Dec. 10, 2020

(65) Prior Publication Data
US 2022/0195144 A1    Jun. 23, 2022

Related U.S. Application Data

(60) Provisional application No. 62/856,774, filed on Jun. 4, 2019.

(51) Int. Cl.
*C08G 77/08* (2006.01)
*C08K 5/55* (2006.01)
*C08L 83/06* (2006.01)

(52) U.S. Cl.
CPC ............... *C08K 5/55* (2013.01); *C08G 77/08* (2013.01); *C08L 83/06* (2013.01)

(58) Field of Classification Search
CPC .............................. C08G 77/08; C08G 77/06
See application file for complete search history.

(56) References Cited

U.S. PATENT DOCUMENTS

| | | | |
|---|---|---|---|
| 4,254,271 A | 3/1981 | Finke et al. | |
| 5,721,290 A | 2/1998 | Eckberg et al. | |
| 5,866,261 A | 2/1999 | Kerr, III et al. | |
| 6,548,568 B1 | 4/2003 | Pinto et al. | |
| 6,777,512 B1 | 8/2004 | Sonnenschein et al. | |
| 7,064,173 B2 | 6/2006 | Rubinsztajn et al. | |
| 7,906,605 B2 | 3/2011 | Cray et al. | |
| 8,048,819 B2 | 11/2011 | Rubinsztajn et al. | |
| 8,299,284 B2 * | 10/2012 | Stephan ................ | C07F 9/5022 556/23 |
| 8,470,899 B2 | 6/2013 | Malivemey | |
| 8,629,222 B2 | 1/2014 | Takizawa et al. | |
| 8,968,868 B2 | 3/2015 | Yang et al. | |
| 9,006,336 B2 | 4/2015 | Yang et al. | |
| 9,006,357 B2 | 4/2015 | Yang et al. | |
| 9,035,008 B2 | 5/2015 | Yang et al. | |
| 9,624,154 B2 | 4/2017 | Blair | |
| 9,856,194 B2 | 1/2018 | Fontaine et al. | |
| 10,259,908 B2 | 4/2019 | Arkles et al. | |
| 2003/0139287 A1 | 7/2003 | Deforth et al. | |
| 2005/0136269 A1 | 6/2005 | Doehler et al. | |
| 2006/0211836 A1 | 9/2006 | Rubinsztajn et al. | |
| 2006/0241271 A1 | 10/2006 | Rubinsztajn et al. | |
| 2006/0280957 A1 | 12/2006 | Lee et al. | |
| 2006/0293172 A1 | 12/2006 | Rubinsztajn et al. | |
| 2008/0281469 A1 | 11/2008 | Choi et al. | |
| 2009/0192282 A1 | 7/2009 | Janvikul et al. | |
| 2010/0144960 A1 | 6/2010 | Cray et al. | |
| 2013/0234070 A1 | 9/2013 | Mowrer | |
| 2015/0141570 A1 | 5/2015 | Buckanin et al. | |
| 2016/0289388 A1 | 10/2016 | Fu et al. | |
| 2019/0031932 A1 | 1/2019 | Zhang et al. | |
| 2019/0062467 A1 * | 2/2019 | Knaus ................. | C08F 4/52 |
| 2019/0262817 A1 * | 8/2019 | Fontaine ............... | B01J 31/063 |
| 2022/0162392 A1 * | 5/2022 | Courtemanche ....... | C08G 77/12 |
| 2022/0169794 A1 * | 6/2022 | Courtemanche ....... | C08G 77/16 |
| 2022/0169795 A1 * | 6/2022 | Courtemanche ....... | C08G 77/12 |
| 2022/0195144 A1 * | 6/2022 | Courtemanche ........ | C08L 83/06 |

FOREIGN PATENT DOCUMENTS

| | | | |
|---|---|---|---|
| CA | 2894146 A1 | 6/2014 | |
| CN | 1989178 A | 6/2007 | |
| CN | 104877310 A | 9/2015 | |
| FR | 2824835 A1 | 11/2002 | |
| WO | 2008125911 A2 | 10/2008 | |
| WO | 2011045605 A1 | 4/2011 | |
| WO | 2012060449 A1 | 5/2012 | |
| WO | 2013142956 A1 | 10/2013 | |
| WO | 2016097734 A1 | 6/2016 | |
| WO | 2016168914 A1 | 10/2016 | |
| WO | 2017100904 A1 | 6/2017 | |

(Continued)

OTHER PUBLICATIONS

Grande, "Testing the functional tolerance of the Piers-Rubinsztajin reaction: a new strategy for functional silicones", Chem. Comm., 2010, pp. 4988-4990, vol. 46.
Asenjo-Sanz et al., "Zwitterionic Polymerization of Glycidyl Monomers to Cyclic Polyethers with B(C6F5)3" The Royal Society of Chemistry, 2012 pp. 1-5.
Berkefeld, "Tandem Frustrated Lewis Pair/Trisborane-Catalyzed Deoxygenative Hydrosilylation of Carbon Dioxide", JACS, 2010, pp. 10060-10661, vol. 132.
Brook, "New Control Over Silicone Synthesis using SiH Chemistry: The Piers-Rubinsztajn Reaction", Chem. Eur. J., 2018, pp. 8458-8469, vol. 24.
Cella, "Preparation of Polyaryloxysilanes and Polyaryloxysiloxanes by B(C6F5)3 Catalyzed Polyetherification of Dihydrosilanes and Bis-Phenols", Macromolecules, 2008, pp. 6965-6971, vol. 41.
Chakraborty et al., "Catalytic Ring-Opening Polymerization of Propylene Oxide by Organoborane and Aluminum Lewis Acids" Macromolecules, 2003, pp. 5470-5481.
Chen et al., "B(C6F5)3-Catalyzed Group Transfer Polymerization of Acrylates Using Hydrosilane: Polymerization Mechanism, Applicable Monomers, and Synthesis of Well-Defined Acrylate Polymers", Macromolecules, 2019, pp. 844-856, vol. 52.

(Continued)

*Primary Examiner* — Margaret G Moore

(57) ABSTRACT

A composition contains a mixture of silyl hydride, epoxide and a Bridged Frustrated Lewis Pair.

19 Claims, No Drawings

(56) References Cited

FOREIGN PATENT DOCUMENTS

| WO | 2019070866 A1 | 4/2019 |
|---|---|---|
| WO | 2020247337 A1 | 12/2020 |

OTHER PUBLICATIONS

Chojnowski et al., "Mechanism of the B(C6F5)3-Catalyzed Reaction of silyl Hydrides with Alkoxysilanes. Kinetic and Spectroscopic Studies" Organometallics, 2005, vol. 24, pp. 6077-6084.

Chojnowski, "Hydride Tranfer Ring-Opening Polymerization of a Cyclic Oligomethylhydrosiloxane. Route to a Polymer of Closed Multicyclic Structure", Macromolecules, 2012, pp. 2654-2661, vol. 45.

Chojnowski, "Oligomerization of Hydrosiloxanes in the Presence of Trisborane", Macromolecules, 2006, pp. 3802-3807, vol. 39.

Fawcett et al., "Rapid, Metal-Free Room Temperature Vulcanization Produces Silicone Elastomers" J. Polym. Sci. A Polym. Chem., 2013, vol. 51, pp. 644-652.

Fuchise, "B(C6F5)3-Catalyzed Group Transfer Polymerization of n-Butyl Acrylate with Hydrosilane through In Situ Formation of Initiator by 1,4 Hydrosilylation of n-Butyl Acrylate", ACS Macro Lett., 2014, pp. 1015-1019, vol. 3.

Herzberger et al., "Polymerization of Ethylene Oxide, Propylene Oxide, and Other Alkylene Oxides: Synthesis, Novel Polymer Architectures, and Bioconjugation" Chemical Reviews, American Chemical Society, 2016, pp. 2170-2243.

Hoque, "Polysiloxanes with Periodically Distrubuted Isomeric Double-Decker Silsesquioxane in the Main Chain", Macromolecules, 2009, pp. 3309-3315, vol. 42.

Khalimon et al., "A Photo Lewis Acid Generator (PhLAG): Controlled Photorelease of B(C6F5)3", JACS, 2012, pp. 9601-9604, vol. 134.

Khalimon, "Photo Lewis acid generators: photorelease of B(C6F5)3 and applications to catalysis", Dalt. Trans., 2015, pp. 18196-18206, vol. 44.

Kim, "Metal-Free Hydrosilylation Polymerization by Borane Catalyst", Angew. Chem. Int. Ed, 2015, pp. 14805-14809, vol. 54.

Lambert et al., "A Stable B-Silyl Carbocation", J. Am. Chem. Soc., 1996, vol. 118, pp. 7867-7868.

Lambert et al., "B-Silyl and B-Germyl Carbocations Stable at Room Temperature", J. Org. Chem., 1999, vol. 64, pp. 2729-2736.

Matsumoto et al., "One-Pot Sequence-Controlled Synthesis of Oligosiloxanes" Angew. Chem. Int. Ed. 2018, vol. 57, pp. 4637-4641.

Mitsuo, "NewHorizon of Organosilicon Chemistry", Dalt. Trans., 2010, pp. 9369-9378, vol. 39.

Momming, "Reversible Metal-Free Carbon Dioxide Binding by Frustrated Lewis Paris", Angew. Chem. Int. Ed., 2009, pp. 6643-6646, vol. 48.

Oertle et al., "Hydrosilylation of tetrasubstituted Olefins" Tetrahedron Lett., 1985, vol. 26, pp. 5511-5514.

Oestreich, "A unified survey of Si-H and H-H bond activation catalysed by electron-deficient boranes", Chem. Soc. Rev., 2015, pp. 2202-2220, vol. 44.

Perez et al., "Olefin Isomerization and Hydrosilylation Catalysis by Lewis Acidic Organofluorophosphonium Salts" J. Am. Chem. Soc., 2013, 135, 18308.

Piers et al., "Mechanistic Aspects of Bond Activation with Perfluoroarylboranes", Inorg. Chem., 2011, vol. 50, pp. 12252-12262.

Rubin et al., "Highly Efficient B(C6F5)3-Catalyzed Hydrosilylation of Olefins" J. Org. Chem, 2020, vol. 67, pp. 1936-1940.

Simonneau et al., "3-Silylated Cyclohexa-1,4-dienes as Precursors for Gaseous; Hydrosilanes: The B(C6F5)3-Catalyzed Transfer Hydrosilylation of; Alkenes" Angew. Chem. Int. Ed., 2013, vol. 52, pp. 11905-11907.

Song et al., "Lewis Acid-Catalyzed Regio- and Stereoselective Hyddrosiylation of Alkenes with Trialkylsilanes" Organometallics, 1999, vol. 18, pp. 3109-3115.

Stephan, "Frustrated Lewis Pair Chemistry: Development and Perspectives", Angew. Chem. Int. Ed., 2015, pp. 6400-6441, vol. 54.

Stephan, "Frustrated Lewis Pairs", JACS, 2015, pp. 10018-10032, vol. 137.

Yamamoto et al., "Sterochemistry of Aluminum Chloride Catalyzed Hydrosilylation of Methylcyclohexenes" Synlett, 1990, pp. 259-260.

Zhang, "Piers' borane-mediated hydrosilylation of epoxides and cyclic ethers", Chem. Commun., 2018, pp. 7243-7246, vol. 54.

Zhao et al., "N-HeterocyclicCarbene-Catalysed Hydrosilylation of Styryl and Propargylic Alcohols with Dihydrosilanes" Chem. Eur. J., 2011, vol. 17, pp. 9911-9914.

\* cited by examiner

BRIDGED FRUSTRATED LEWIS PAIRS AS THERMAL TRIGGER FOR REACTIONS BETWEEN SI-H AND EPOXIDE

CROSS REFERENCE TO RELATED APPLICATIONS

This application is a U.S. national stage filing under 35 U.S.C. § 371 of PCT Application No. PCT/US20/035645 filed on 2 Jun. 2020, which claims the benefit of U.S. Provisional Patent Application No. 62/856,774 filed 4 Jun. 2019 under 35 U.S.C. § 119(e). PCT Application No. PCT/US20/035645 and U.S. Provisional Patent Application No. 62/856,774 are hereby incorporated by reference.

BACKGROUND OF THE INVENTION

Field of the Invention

The present invention relates to use of a bridged frustrated Lewis pair as a thermal trigger for chemical reaction between silyl hydrides and epoxides. The bridged frustrated Lewis pair dissociates to release a Lewis acid upon heating. The Lewis acid serves as a catalyst for the chemical reaction between silyl hydrides and epoxides.

Introduction

Frustrated Lewis Pairs ("FLPs") is a term that refers to pairs of Lewis acids and Lewis bases in which steric congestion precludes the Lewis acid and Lewis base from complexing and neutralizing each other. When combined, the Lewis acids and bases of FLPs remain independent from one another rather than combine to neutralize one another. Yet, FLPs have been found to bind indirectly to one another in the form of Bridged Frustrated Lewis Pairs ("B-FLPs"), where a bridging molecule is bound to both the acid and the base of a FLP to create a complex with the bridging molecule between the Lewis acid and Lewis base. In some instances, the bridging molecule can sever to create a blocked Lewis acid and a blocked Lewis base with a portion of the bridging molecule complexed with and blocking each of the Lewis acid and Lewis base from further complexing or reacting. Hydrogen ($H_2$) is an example of a bridging molecule that severs in such a manner upon forming a B-FLP.

B-FLPs have been used to activate the bridging molecule for use in chemical reactions. For example, hydrogen ($H_2$) has been used as a bridging molecule in a B-FLP in order to activate the hydrogen for use in hydrogenation reactions (See, for example, JACS 2015, 137, 10018-10032) and carbon dioxide has been used as a bridging molecules in B-FLP in order to activate the carbon dioxide for deoxygenative hydrosilylation (See, for example, JACS 2010, 132, 10660-10661). Other molecules used as bridging molecules in a B-FLP for use in activating them for chemical reactions include nitrous oxide ($N_2O$), sulfur dioxide ($SO_2$), alkenes and alkynes. See, for example: Angew. Chem. Int. Ed. 2009, 48, 6643-6646; Angew. Chem. Int. Ed. 2015, 54, 6400-6441; and JACS 2015, 137, 10018-10032.

It would be surprising and useful to discover additional uses for B-FLPs, particularly if such uses allow control over chemical reactions other than those involving the bridging molecule.

BRIEF SUMMARY OF THE INVENTION

The present invention offers a surprising and unexpected use for B-FLPs as thermal triggers for addition reactions between silyl hydride (Si—H) and epoxide functionalities.

Addition reactions, such as hydrosilylation reactions, typically require the presence of a transition metal catalyst. However, it has been discovered that silyl hydride and epoxide functionalities undergo an addition reaction in the presence of a Lewis acid catalyst without the need for a transition metal catalyst. Lewis acids are known to catalyze a reaction between silyl hydride and silyl ether in what is known as Piers-Rubinsztajn ("PR") reaction. However, unlike the PR reaction, the present reaction between a silyl hydride and epoxy does not require a silyl ether nor does the present reaction generate gaseous by-products like the PR reaction. The present invention also offers benefits over typical addition reactions because it does not require a transition metal catalyst.

Like the PR reaction, the Lewis acid catalyzed addition reaction between silyl hydride and epoxide can be desirable for curing siloxanes in coating, adhesive, elastomer and foaming applications. However, the epoxide/silyl hydride reaction tends to be rapid so their usage requires supplying and storing the reactive systems as two-part systems where the Lewis acid catalyst is kept apart from the Si—H and/or the epoxide until reaction is desired. One-component systems are more easily handled and are desirable over two-part systems, so it is desirable if reaction components could be combined together in a one-part system but that did not immediately cure to a gel unless heated to a trigger temperature. Ideally, the one-part system would be shelf stable for storage, or at least experience delayed curing at 23° C. to increase handling time, but includes a means to trigger the addition reaction when desired to rapidly cure the system.

There are systems for PR reactive materials where the Lewis acid catalyst is complexed with an ultraviolet (UV) sensitive blocker that precludes the catalyst from enabling a PR reaction until irradiated with UV light. However, such systems need to be stored in the dark for shelf stability and must be exposed to UV light to initiate curing. It can be desirable to avoid the need to store in darkness and expose to light to trigger a reaction in a system.

The present invention is a result of discovering that B-FLPs can be used in silyl hydride/epoxide reaction systems as latent Lewis acid catalysts which are released thermally upon heating to a trigger temperature. That is, a B-FLP can be combined with a silyl hydride and an epoxide to form a stable one-part reactive system that is shelf stable, or at least has delayed reactivity, at 23° C. but that reacts quickly when heated to release the Lewis acid from the B-FLP. When heated, the Lewis acid dissociates from the B-FLP, allowing the Lewis acid to act as a reaction catalyst to initiate the addition reaction between the silyl hydride and epoxide. Desirably, compositions of the present invention can be exposed to UV light without triggering the reaction by unblocking the Lewis acid.

B-FLPs have been found to be particularly efficient triggering agents because once broken they are unlikely to recombine. That means that once the Lewis acid is freed it will continue to catalyze the reaction without inhibition by reformation of the B-FLP. That is an advantage over Lewis acids inhibited with Lewis base directly because the Lewis base remains in solution and can recombine with a free Lewis acid to neutralize the Lewis acid. B-FLPs require reformation of a bridged complex between the Lewis acid and base, which is much less likely to randomly occur. This is particularly true with fugitive bridging molecules such as those that are gaseous and escape the reaction system once the B-FLP is broken. As a result, use of a B-FLP offers unprecedented control over irreversibly triggering the reaction without interference form a catalyst inhibitor because when heated sufficiently to dissociate the B-FLP, the acid catalyst is expected to be essentially irreversibly released to catalyze the rapid reaction.

In a first aspect, the present invention is composition comprising a mixture of silyl hydride, an epoxide, and a Bridged Frustrated Lewis Pair.

In a second aspect, the present invention is a chemical reaction process comprising the steps of: (a) providing a composition of the first aspect; and (b) heating the composition to a temperature sufficient to dissociate the Lewis acid from the Bridged Frustrated Lewis Pair.

The present invention is useful for preparing coatings, adhesives, and elastomers.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standardization.

Products identified by their tradename refer to the compositions available from the suppliers under those tradenames on the priority data of this application.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

The composition of the present invention comprises a mixture of silyl hydride, epoxide and a Bridged Frustrated Lewis Pair. The composition is useful as a one-part reactive system that is shelf stable, or at least that experiences delayed gelling, at 23° C., yet that upon heating gels within 2 minutes, preferably within one minute, even more preferably in 30 seconds or less. "Delayed gelling" means gelling take 3 minutes or longer at 23° C. "Shelf stable" means the composition does not gel at 23° C. in 5 hours or less, preferably 10 hours less, more preferably 15 hours or less, even more preferably 24 hours or less and yet more preferably one week or less.

"Silyl hydrides" are molecules that contain a silicon-hydrogen (Si—H) bond and can contain multiple Si—H bonds.

"Alkyl" is a hydrocarbon radical derived from an alkane by removal of a hydrogen atom. "Substituted alkyl" is an alkyl that has an atom, or chemical moiety, other than carbon and hydrogen in place of at least one carbon or hydrogen.

"Aryl" is a radical derived from an aromatic hydrocarbon by removal of a hydrogen atom. "Substituted aryl" is an aryl that has an atom, or chemical moiety, other than carbon and hydrogen in place of at least one carbon or hydrogen.

"Epoxide" refers to a molecule that contains at least one, and can contain more than one, epoxide functionality where an "epoxide functionality" (or "epoxide functionality") is a three-member ring containing two carbon atoms and one oxygen atom.

A "Frustrated Lewis Pair", or "FLP", is a system of Lewis acids and Lewis bases in which steric congestion precludes the Lewis acid and Lewis base from complexing and completely neutralizing ("blocking") each other. FLPs are known in the art and have been characterized in articles such as JACS 2015, 137, 10018-10032 and the articles identified therein. Desirably, the FLP is a system of Lewis acids and Lewis bases in which congestion precludes their complexing and neutralizing at 20 degrees Celsius (° C.). While FLPs are known in the art, one can determine whether any Lewis pair is a FLP by combining at 20° C. equal molar amounts of the Lewis acid and Lewis base in a solvent that dissolves both. If more than 10 molar percent of the Lewis acid and Lewis base remain dissociated then the Lewis acid and Lewis base can be considered a FLP. Determine extent of dissociation by any means reasonable such as by nuclear magnetic resonance spectroscopy or, preferably ion chromatography using conductimetric or photometric detectors.

Upon heating compositions of the present invention, the B-FLP releases Lewis acid which catalyzes a reaction between the epoxide and the silyl hydride that forms new siloxy (Si-0) bonds. Heating the composition to a temperature of 80° C. or higher, 90° C. or higher, 100° C. or higher, 110° C. or higher, 120° C. or higher, 130° C. or higher, 140° C. or higher, 150° C. or higher, 160° C. or higher, 170° C. or higher, 180° C. or higher, 190° C. or higher, 200° C. or higher, 210° C. or higher and at the same time, generally 300° C. or lower, 250° C. or lower, 240° C. or lower, 230° C. or lower, 220° C. or lower, 210° C. or lower, 200° C. or lower, 175° C. or lower, 150° C. or lower, 140° C. or lower, 130° C. or lower, 120° C. or lower, 110° C. or lower, or even 100° C. or lower causes the components in the composition to react and cure in 2 minutes or less, preferably one minute or less, and even more preferably in 30 seconds or less.

The reaction between an epoxide and silyl hydride is an addition reaction across an epoxide functionality generally represented by the following reaction:

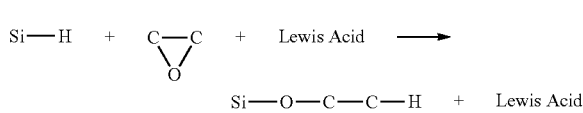

The composition of the present invention provides delayed gelling and desirably is shelf stable.

Epoxide

The epoxide can be any compound having one or more than one epoxide functionality. The epoxide can comprise silicon atoms in the form of, for instance, one or more than one siloxane (Si—O—Si) linkage. The epoxide can be a polysiloxane, having multiple siloxane linkages, with one or more than one epoxide functionality.

Polysiloxanes contain multiple siloxane linkages and can be characterized by the siloxy (SiO) groups that make up the polysiloxane. Siloxy groups are M-type, D-type, T-type or Q-type. M-type siloxy groups can be written as $\equiv SiO_{1/2}$ where there are three groups bound to the silicon atom in addition to an oxygen atom that is shared with another atom linked to the siloxy group. D-type siloxy groups can be written as $=SiO_{2/2}$ where there are two groups bound to the silicon atom in addition to two oxygen atoms that are shared with other atoms linked to the siloxy group. T-type siloxy groups can be written as $-SiO_{3/2}$ where one group is bound to the silicon atom in addition to three oxygen atoms that are shared with other atoms linked to the siloxy group. Q-type siloxy groups can be written as $SiO_{4/2}$ where the silicon atom is bound to four oxygen atoms that are shared with other atoms linked to the siloxy group. The groups bound to the silicon atom are considered methyl groups unless otherwise specified. For instance, an "M" group is the same as trimethylsiloxy. An "$M^H$" group has two methyl groups and a hydrogen bound to a silox group. Epoxy functional polysiloxanes generally have an organic group containing an epoxy functionality bound to a silicon atom of the polysiloxane.

Examples of suitable polysiloxane epoxides for use in the present invention include any one or any combination or more than one of the following:

$MD_aD^{CEP}{}_bM$ where subscript a is the average number of D siloxy units and is typically a value of 20 or more, 30 or more, 40 or more, 50 or more, 60 or more, 70 or more, 80 or more 90 or more 100 or more 110 or more and at the same time is generally 150 or less, 140 or less, 130 or less, 120 or less, and can be 110 or less, 100 or less, 90 or less, 80 or less and even 70 or less; subscript b is the average number of $D^{CEP}$ siloxy units per molecule and is typically a value of one or more, 2 or more, 3 or more, 4 or more, 5 or more, 6 or more, 7 or more, 8 or more, 9 or more, or 10 or more and at the same time is typically 20 or less, 19 or less, 18 or less, 17 or less, 16 or less, 15 or less, 14 or less, 13 or less, 12 or less, 11 or less, 10 or less, 9 or less, or even 8 or less; and $D^{CEP}$ is a D siloxy unit where one of the methyl groups is replaced with a pendant structure having a cyclic epoxide group, preferably a terminal cyclic epoxide group. For example, $D^{HEP}$ is a $D^{CEP}$ that is a D siloxy unit where one of the methyl groups is replaced with ethyl-cyclohexene oxide:

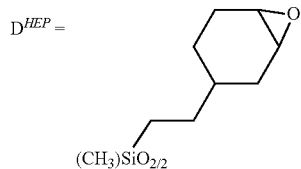

$MD_aD^{EP}{}_bM$ where subscript a is the average number of D siloxy units per molecule and is as defined above; subscript b' is the average number of $D^{EP}$ siloxy units per molecule and is typically a value of one or more, 2 or more, 3 or more, 4 or more, 5 or more, 6 or more, 7 or more, 8 or more, 9 or more, or 10 or more and at the same time is typically 20 or less, 19 or less, 18 or less, 17 or less, 16 or less, 15 or less, 14 or less, 13 or less, 12 or less, 11 or less, 10 or less, 9 or less, or even 8 or less; and $D^{EP}$ is a D siloxy unit where one of the methyl groups is replaced with a pendant structure having a linear epoxide group, preferably a terminal epoxide group. An example of a $D^{EP}$ unit is shown below:

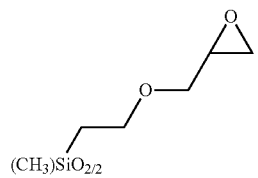

$M^{CEP}D_cM^{CEP}$ where subscript c is the average number of D siloxy units per molecule and typically has a value of 5 or more, 10 or more, 15 or more, 20 or more, 25 or more, 30 or more, 35 or more, 40 or more, 45 or more, 50 or more, 55 or more, or 60 or more and at the same time typically has a value of 100 or less, 90 or less, 80 or less, 70 or less, 65 or less, or 60 or less; and $M^{CEP}$ is an M siloxy unit where one of the methyl groups is replaced with a cyclic epoxide group, preferably terminal cyclic epoxide group. For example, $M^{HEP}$ is an M siloxy unit where one of the methyl groups is replaced with ethyl-cylcohexene oxide:

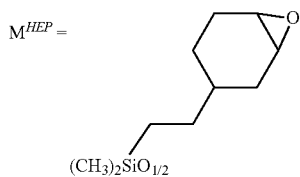

$D^{EP}{}_xD_cT_2$ where subscripts x and c correspond to the average number of moles of the corresponding siloxy unit per molecule; subscript "x" typically has a value of 6 or more, 7 or more 8 or more 9 or more and even 10 or more while at the same time typically has a value of 20 or less, 19 or less, 18 or less, 17 or less, 16 or less, 15 or less, 14 or less, 13 or less, 12 or less, 11 or less, 10 or less, 9 or less or even 8 or less; subscript "c" typically has a value as defined for subscript c above for $M^{HEP}D_cM^{HEP}$; $D^{EP}$ is as defined above and forms a cyclic ring with the T end groups.

The epoxide can contain linear epoxide groups or cyclic epoxide groups or both linear and cyclic epoxide groups. Linear epoxide groups contain carbon atoms of the epoxide functionality but that bond directly to one another to form the 3-membered cyclic epoxide functionality are not connect directly or indirectly with one another in any other way. "Cyclic epoxide" groups contain carbon atoms of the epoxide functionality that are both bound directly to one another to form the 3-membered cyclic epoxide functionality and are also directly or, more typically, indirectly through other atoms bound to one another in a second bond or chain of bonds. For example, the cyclohexene oxide group of the $D^{HEP}$ unit identified above is a "cyclic" epoxide because the two epoxide functionality carbons are bound directly to one another and also indirectly again through the four other carbons of the 6-membered ring. In contrast, the $D^{EP}$ unit identified above contains a "linear" epoxide because the two epoxide functionality carbons are bound to one another only directly in the epoxide functionality.

Typically, the concentration of epoxide in the composition is 70 weight-percent (wt %) or more, 75 wt % or more, 80 wt % or more, 85 wt % or more, even 90 wt % or more while at the same time is typically 90 wt % or less, 85 wt % or less, 80 wt % or less, or even 75 wt % or less based on the combined weight of silyl hydride, epoxide and Bridged Frustrated Lewis Pair.

Silyl Hydride

The silyl hydride contains one, preferably more than one, Si—H bond. The Si—H bond is typically part of polysilane (molecule containing multiple Si—H bonds) or polysiloxane. Silyl hydrides containing multiple Si—H bonds are desirable as crosslinkers in compositions of the present invention because they are capable of reacting with multiple epoxide groups.

The silyl hydride of the present invention can be polymeric. The silyl hydride can be linear, branched or can contain a combination of linear and branched silyl hydrides. The silyl hydride can be a polysilane, a polysiloxane or a combination of polysilane and polysiloxanes.

Desirably, the silyl hydride is a polysiloxane molecule with one or more than one Si—H bond. If the silyl hydride is a polysiloxane, the Si—H bond is on the silicon atom of an M-type or D-type siloxane unit. The polysiloxane can be linear and comprise only M type and D type units. Alternatively, the polysiloxane can be branched and contain T ($-SiO_{3/2}$) type and/or Q ($SiO_{4/2}$) type units.

Examples of suitable silyl hydrides include pentamethyldisiloxane, bis(trimethylsiloxy)methyl-silane, tetramethyldisiloxane, tetramethylcyclotetrasiloxane, $D^H$ containing poly(dimethylsiloxanes) (for example, $MD^H{}_{65}M$), and hydride terminated poly(dimethylsiloxane) such as those available from Gelest under the tradenames: DMS-HM15, DMS-H03, DMS-H25, DMS-H31, and DMS-H41.

The concentration of silyl hydride is typically sufficient to provide a molar ratio of Si—H groups to epoxide groups that is 0.2 or more, 0.5 or more, 0.7 or more, 0.8 or more, 0.9 or more, 1.0 or more 1.2 or more, 1.4 or more, 1.6 or more, 1.8 or more, 2.0 or more, 2.2 or more, even 2.5 or more while at the same time is typically 5.0 or less, 4.5 or less, 4.0 or less, 3.5 or less, 3.0 or less, 2.8 or less, 2.5 or less, 2.3 or less, 2.0 or less, 1.8 or less, 1.6 or less, 1.4 or less, 1.2 or less or even 1.0 or less.

Either the epoxide or the silyl hydride (or both) can serve as crosslinkers in the reaction. A crosslinker has at least two reactive groups per molecule and reacts with two different molecules through those reactive groups to cross link those molecules together. Increasing the linear length between reactive groups in a crosslinker tends to increase the flexibility in the resulting crosslinked product. In contrast, shortening the linear length between reactive groups in a crosslinker tends to reduce the flexibility of a resulting crosslinked product. Generally, to achieve a more flexible crosslinked product a linear crosslinker is desired and the length between reactive sites is selected to achieve desired flexibility. To achieve a less flexible crosslinked product, shorter linear crosslinkers or even branched crosslinkers are desirable to reduce flexibility between crosslinked molecules.

The silyl hydride can be the same molecule as the epoxide—that is, a single molecule containing both epoxide and silyl hydride functionality can serve the roll as both the silyl hydride and epoxide. Alternatively, the silyl hydride can be a different molecule from the epoxide. The silyl hydride can be free of epoxide functionality. The epoxide can be free of silyl hydride groups.

The composition (and reaction process) of the present invention can comprise more than one silyl hydride, more than one epoxide and/or more than one component that serves as both a silyl hydride and siloxane.

Typically, the concentration of silyl hydride in the composition is 5 wt % or more, 10 wt % or more, 15 wt % or more, 20 wt % or more, even 25 wt % or more while at the same time is typically 30 wt % or less, 25 wt % or less, 20 wt % or less, 15 wt % or less or even 5 wt % or less based on the combined weight of silyl hydride, epoxide and Bridged Frustrated Lewis Pair.

Bridged Frustrated Lewis Pair

The Bridged Frustrated Lewis Pair ("B-FLP") is a complex comprising a FLP wherein a Lewis acid and a Lewis base of the FLP are both bound to a bridging molecule to form a neutralized complex with the bridging molecules residing between (that is, "bridging") the Lewis acid and Lewis base. The bridging molecule can severe, such as in the case of $H_2$, with a portion of the bridging molecule blocking the Lewis acid and another portion of the bridging molecule blocking the Lewis base. Alternatively, and preferably, the bridging molecule remains intact and the B-FLP is a stable complex (at least at 23° C.) with the bridging molecule simultaneously bound to the Lewis acid of the FLP and the Lewis base of the FLP.

The Lewis acid is selected from a group consisting of aluminum alkyls, aluminum aryls, aryl boranes including triaryl borane (including substituted aryl and triaryl boranes such as fluorinated aryl boranes including tris(pentafluorophenyl)borane), boron halides, aluminum halides, gallium alkyls, gallium aryls, gallium halides, silylium cations and phosphonium cations. Examples of suitable aluminum alkyls include trimethylaluminum and triethylaluminum. Examples of suitable aluminum aryls include triphenyl aluminum and tris-pentafluorophenyl aluminum. Examples of triaryl boranes include those having the following formula:

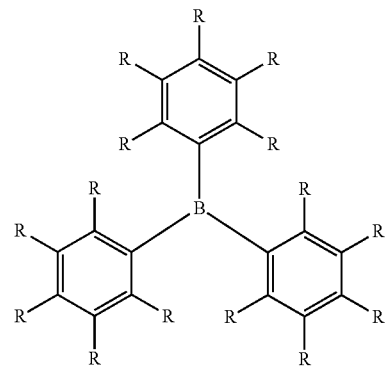

where R is independently in each occurrence selected from H, F, Cl and $CF_3$. Examples of suitable boron halides include $(CH_3CH_2)_2BCl$ and boron trifluoride. Examples of suitable aluminum halides include aluminum trichloride. Examples of suitable gallium alkyls include trimethyl gallium. Examples of suitable gallium aryls include triphenyl gallium. Examples of suitable gallium halides include trichlorogallium. Examples of suitable silylium cations include $(CH_3CH_2)_3Si^+X^-$ and $Ph_3Si^+X^-$. Examples of suitable phosphonium cations include $F-P(C_6F_5)_3{}^+X^-$.

The Lewis base is selected from a group consisting of the following bases: $PR_3$, $P(NR_2)_3$, $NR_3$, $N(SiR_3)_xR_{3-x}$, $RC(NR)N$, $P(N-R)R_3$, guanidines ($C(=NR)(NR_2)_2$), amidines ($RC(=NR)NR_2$), phosphazenes, and

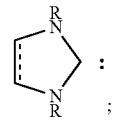

where R is in each occurrence independently selected from a group consisting of hydrogen, alkyl, substituted alkyl, aryl and substituted aryl. Examples of suitable Lewis basis of the structure $PR_3$ include tri(t-butyl)phosphine, tri(cyclohexyl)phosphine, $PhP(tBu)_2$; (cylcohexyl)$P(tBu)_2$; $nBuP(tBu)_2$; $Me(tBu)_2$; $tBuP(i-Pr)_2$; $P(C_6H_{11})_3$; $P(iBu)_3$; and $P(n-Bu)_3$.

Examples of suitable Lewis basis of the structure RC(NR)N include 1,5,7-Triazabicyclo[4.4.0]dec-5-ene; 7-Methyl-1,5,7-triazabicyclo4.4.0dec-5-ene; 2,3,4,6,7,8,9,10-Octahydropyrimidol[1,2-a]azepine, (DBU). Examples of suitable guanidines include guanidine, biguanidine, and 1,1-dimethylguanidine. Examples of suitable amidines include diethylamide, and di-isopropyl amide. Examples of suitable phosphazenes include tert-Butylimino-tri(pyrrolidino)phosphorene; tert-Octylimino-tris(dimethylamino)phosphorene; and 2-tert-butylimino-2-diethylamino-1,3-dimethylperhydro-1,3,2-diazaphosphorine. Examples of suitable Lewis basis of the structure:

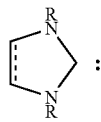

include 1,3-dimesityl-imidazol-4,5-dihydro-2-ylidene; 1,3-Bis(2,6-diisopropylphenyl)imidazol-2-ylidene; and 1,3-Bis(2,4,6-trimethylphenyl)-4,5-dihydroimidazol-2-ylidene.

The bridging molecule, in the broadest scope of the present invention, includes any molecule that will simultaneously bind and block the Lewis acid and Lewis base of a FLP to form a B-FLP. The interaction of the bridging molecule with the Lewis acid and Lewis base is such that the Lewis acid and Lewis base is blocked by the bridging molecule (or portion thereof) at 23° C. but unblocks at least the Lewis acid at temperatures of 120° C. or higher, preferably 110° C. or higher, more preferably 100° C. or higher, even more preferably 90° C. or higher, 80° C. or higher, or even 70° C. or higher and at the same time desirably 300° C. or lower, 240° C. or lower, 220° C. or lower, 200° C. or lower, 180° C. or lower, 160° C. or lower, 150° C. or lower, 125° C. or lower or even 100° C. or lower. Unblocking of the Lewis acid of the B-FLP can be evidenced by a composition of the present invention containing the B-FLP curing in less than $\frac{1}{10}^{th}$ the time required for it to gel at 23° C.

Examples of suitable bridging molecules include carbon dioxide, hydrogen molecule ($H_2$), nitriles, alkenes, alkynes, ketones, esters and aldehydes. Desirably, the bridging molecule contains 10 or fewer, preferably 9 or fewer and can contain 8 or fewer, 7 or fewer, 6 or fewer, 5 or fewer, 4 or fewer, 3 or fewer, 2 or fewer and even one or fewer or zero carbon atoms; while at the same time the bridging molecule can contain one or more, 2 or more, 3 or more, 4 or more, 5 or more and even 6 or more carbon atoms. As noted earlier herein, some bridging molecules can sever in the B-FLP with a portion of the bridging molecule blocking the Lewis acid and a portion of the bridging molecule blocking the Lewis base. It is preferable for the bridging molecule to remain non-severed while bridging the Lewis acid and Lewis base of a FLP. In that regard, the bridging molecule preferably is not $H_2$. More preferably, the bridging molecule does not include any molecules that sever while bridging the Lewis acid and Lewis base of a FLP.

The B-FLP is desirably "stable" in the composition of the present invention, which means it does not dissociate to release Lewis acid, at temperatures of 23° C. and lower. The B-FLP can be stable at temperatures of 30° C. or lower, 50° C. or lower, 70° C. or lower, even 80° C. or lower. At the same time, the B-FLP dissociates at temperatures of 120° C. and higher, preferably 110° C. and higher, more preferably 110° C. and higher, 100° C. and higher, 90° C. and higher and even 80° C. and higher. Determine if the B-FLP dissociates by looking for evidence of free Lewis acid by nuclear magnetic resonance spectroscopy ($^1H$ and $^{31}P$, $^{11}B$ and/or $^{27}Al$ as appropriate depending on the Lewis acid). Alternatively, dissociation of the B-FLP can be detected by a composition curing faster than the identical composition without B-FLP at a given temperature.

One method for preparing the B-FLP is by combining the Lewis acid and Lewis base of a FLP together with a bridging molecule in a solvent at 23° C. Mixing facilitates formation of the B-FLP. The B-FLP can usually be isolated from the solvent by evaporating the solvent or, if the B-FLP precipitates out from the solvent then by filtration. The B-FLP can be stored for extended periods of time at 23° C. and lower. The B-FLP can be combined with a silyl hydride and a siloxane to form the composition of the present invention.

In contrast to typical blocked Lewis acid systems, the Lewis acid of the B-FLP of the present invention is complexed with a Lewis base through a bridging molecule so it is complexed with two molecules. Prior art has suggested complexing a Lewis acid directly with a blocking agent that is sensitive to ultraviolet (UV) light so upon irradiation with UV light the blocking agent dissociates from the Lewis acid. The B-FLP of the present invention does not require a UV light sensitive blocking agent and can be free of such can be free of components that cause the Lewis acid to be freed from the B-FLP upon irradiation of UV light. The B-FLP and composition of the present invention can be free of photoacid generators and can be free of any other components that upon exposure to UV radiation generates a Lewis acid.

Compositions of the present invention typically contain enough B-FLP to provide a concentration of Lewis acid that is 0.1 weight part per million weight parts (ppm) or more, one ppm or more, 10 ppm or more, 50 ppm or more, 100 ppm or more, 200 ppm or more 300 ppm or more, 400 ppm or more, 500 ppm or more, 600 ppm or more, 700 ppm or more, 800 ppm or more, 900 ppm or more 1000 ppm or more while at the same time typically 10,000 ppm or less, 5,000 ppm or less, 1,000 ppm or less based on combined weight of silyl hydride and epoxide in the composition.

Compositions of the present invention offer the advantage of a one-component reactive system that is shelf stable, or at least demonstrates delayed cure, even when exposed to UV light. Desirably, the stability of B-FLPs of the present invention do not depend on (that is, is independent from) exposure to UV light.

The composition of the present invention can be free of water. Alternatively, the composition of the present invention can comprise water, preferably at a concentration of one weight-percent (wt %) or less, 0.75 wt % or less, 0.5 wt % or less, 0.25 wt % or less 0.1 wt % or less, 0.05 wt % or less or even 0.01 wt % or less based on composition weight.

Optional Components

Compositions of the present invention can consist of the silyl hydride, the epoxide and the B-FLP. Alternatively, the compositions of the present invention can comprise one or a combination of more than one optional component. Optional components are desirably present at a concentration of 50 wt % or less, 40 wt % or less, 30 wt % or less, 20 wt % or less, 10 wt % or less, 5 wt % or less, or even one wt % or less based on composition weight.

Examples of possible optional components include one or a combination of more than one component selected from a group consisting of hydrocarbyl solvents (typically at a concentration of 10 wt % or less, 5 wt % or less, even one wt % or less based on composition weight), pigments such as carbon black or titanium dioxide, fillers such as metal oxides including SiO2 (typically at a concentration of 50 wt % or less based on composition weight), moisture scavengers, fluorescent brighteners, stabilizers (such as antioxidants and ultraviolet stabilizers), and corrosion inhibitors.

The compositions of the present invention also can be free of any one or any combination of more than one such additional components.

Notably, the composition of the present invention can contain one wt % or less, 0.5 wt % or less water relative to composition weight. Desirably, the composition is free of water.

Chemical Reaction Process

The present invention includes a chemical reaction process comprising the steps of: (a) providing a composition of the present invention; and (b) heating the composition to a temperature sufficient to dissociate the Lewis acid from the B-FLP. Upon heating the composition of the present invention, Lewis acid is released from the B-FLP and catalyzes a reaction between the silyl hydride and epoxide as described previously above. The composition of the present invention can be provided in step (a) by mixing together a B-FLP, a silyl hydride and an epoxide. As noted above, the silyl hydride and epoxide can be the same molecule.

The chemical reaction process can be run in an absence of water or with a concentration of water that is one weight-percent (wt %) or less, 0.75 wt % or less, 0.5 wt % or less, 0.25 wt % or less 0.1 wt % or less, 0.05 wt % or less or even 0.01 wt % or less based on weight of the composition provided in step (a).

The composition has application, for example, as coatings that undergo thermally triggered cure reactions or as reactive compositions for molding applications where a fluid is disposed within a mold and heated to trigger a cure to form a molded article. In such applications, the process of the present invention would further include a step after step (a) and prior to step (b) where the composition is applied to a substrate or placed in a mold.

EXAMPLES

Synthesis of B-FLP(1). Working in a glovebox, place in a Schlenk flask equipped with a magnetic stir bar tri(t-butyl)phosphine (200 milligrams (mg), 1.0 millimole (mmol), 1 equivalent (equiv)) and tris-pentafluorophenylborane ("BCF") (500 mg, 1 mmol, 1 equiv) and dissolve the components in 10 milliliters (mL) of toluene. Seal the Schlenk flask and remove from the glovebox. Connect the Schlenk flask to a Schlenk line. Stir the contents of the Schlenk flask throughout the following step. Purge the Schlenk line with nitrogen and then bubble carbon dioxide through the line for two minutes. Open the Schlenk flask to the atmosphere of carbon dioxide and then replace the cap to the flask with a septum. Insert a needle through the septum to create an exit for the carbon dioxide gas and improve carbon dioxide circulation. After 5 minutes a white solid precipitates from the reaction mixture. Seal the flask and stir at room temperature for an additional hour. Move the flask to a glovebox. Add 20 mL of hexane and isolate the white solid by filtration through a glass frit. Wash the white solid with hexane three times (10 mL each time). The white solid is B-FLP(1) (540 mg, 71% yield). B-FLP(1) can be stored without decomposition even when exposed to UV light. Characterize the solid by $^1$H, $^{31}$P and $^{11}$B nuclear magnetic resonance spectroscopy (NMR) to confirm the absence of impurities and starting materials. The expected reaction and structure of B-FLP(1) is as follows:

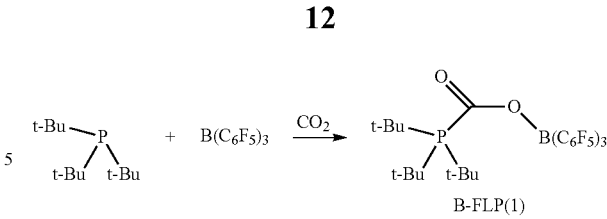

Synthesis of B-FLP(2). Working in a glovebox, place in a Schlenk flask equipped with a magnetic stir bar tri(cyclohexyl)phosphine (546 milligrams (mg), 1.9 millimole (mmol), 1 equivalent (equiv)) and tris-pentafluorophenylborane (998 mg, 1.9 mmol, 1 equiv) and dissolve the components in 10 milliliters (mL) of toluene. Seal the Schlenk flask and remove from the glovebox. Connect the Schlenk flask to a Schlenk line. Stir the contents of the Schlenk flask throughout the following step. Purge the Schlenk line with nitrogen and then bubble carbon dioxide through the line for two minutes. Open the Schlenk flask to the atmosphere of carbon dioxide and then replace the cap to the flask with a septum. Insert a needle through the septum to create an exit for the carbon dioxide gas and improve carbon dioxide circulation. After 5 minutes a white solid precipitates from the reaction mixture. Seal the flask and stir at room temperature for an additional hour. Move the flask to a glovebox. Add 20 mL of hexane and isolate the white solid by filtration through a glass frit. Wash the white solid with hexane three times (10 mL each time). The white solid is B-FLP(2) (1.2 g, 76% yield). B-FLP(2) can be stored without decomposition even when exposed to UV light. Characterize the solid by $^1$H, $^{31}$P and $^{11}$B nuclear magnetic resonance spectroscopy (NMR) to confirm the absence of impurities and starting materials. The expected reaction and structure of B-FLP(2) is as follows:

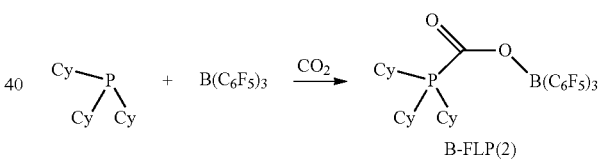

Synthesis of $MD_{60.5}D^H{}_{7.5}M$: To a three-neck flask installed with mechanical stir add 60 gram deionized water, 15 gram heptane and 0.075 gram tosylic acid. Add a mixture of 270 gram dimethyldichlorosilane, 28 gram methyldichlorosilane and 15 gram trimethylchlorosilane dropwise into the reaction solution while stirring over 30 min. After one hour stirring at 23° C., wash the reaction solution 3 times with 80 milliliters deionized water, dry with anhydrous sodium sulfate and filter through activated carbon layer. Remove volatiles by Rotovap to obtain the polymerization product $MD_{60.5}D^H{}_{7.5}M$.

Synthesis of $MD_{60.5}D^{EP}{}_{7.5}M$. To a 500 mL 3N dry flask add 80 g (0.118 mol SiH) $MD_{60.5}D^H{}_{7.6}M$, 2 weight parts per million (ppm) Pt (Karstedt's catalyst) relative to weight of $MD_{60.5}D^H{}_{7.6}M$ and 70 g toluene, followed by heating to 80° C. Add 20.2 g (0.177 mol) AGE (allylglycidyl ether) in 30 g toluene dropwise within 30 min at 80° C., and then heat the reaction mixture to reflux (at about 110° C.) for 6 hours. Monitoring samples over time by $^{29}$Si NMR reveals when reactants are gone and the reaction is complete. Once the reaction is complete, remove solvent and excess AGE by Rotovap to obtain 90 g the product $MD_{60.5}D^{EP}{}_{7.5}M$ with 96% yield.

Synthesis of $MD_{60.5}D^{EP}_{7.5}M$: To a 500 mL 3N dry flask add 110.7 g (0.163 mol SiH) $MD_{60.5}D^{H}_{7.6}M$, 2 ppm Pt (Karstedt's catalyst) relative to weight of $MD_{60.5}D^{H}_{7.6}M$, and 80 g toluene, followed by heating to 80° C. Add 30.4 g (0.245 mol) 4-Vinyl-cyclohexene oxide in 30 g toluene dropwise within 30 min at 80° C., and then heat the reaction mixture to reflux (at about 110° C.) for 6 hours. Monitoring samples over time by $^{29}Si$ NMR reveals when reactants are gone and the reaction is complete. Once the reaction is complete, remove solvent and excess AGE by Rotovap to obtain 127 g the product $MD_{60.5}D^{HEP}_{7.5}M$ with 90% yield.

Synthesis of $M^{HEP}D_{40}M^{HEP}$: To a 500 mL 3N dry flask add 100 g (0.6464 mol) $M^{H}D_{40}M^{H}$ (commercially available as DMS-HM15 from Gelest), 2 ppm Pt (Karstedt's catalyst) relative to weight of $MD_{60.5}D^{H}_{7.6}M$, and 80 mL toluene, followed by heating to 80° C. Add 12 g (0.0.097 mol) 4-vinyl-cyclohexene epoxide in 20 mL toluene dropwise within 25 min at 80° C., and then heat the reaction mixture to reflux (at about 110° C.) for 6 hours. Monitoring samples over time by $^{29}Si$ NMR reveals when reactants are gone and the reaction is complete. Once the reaction is complete, remove solvent and excess AGE by Rotovap to obtain 103 g the product $M^{HEP}D_{40}M^{HEP}$ with 95% yield.

$MD_{117}D^{HEP}_{11.8}M$. This material is commercially available as ECMS-924 from Gelest.

Synthesis of $MD^{H}_{65}M$: To a three-neck flask installed with mechanical stir add 40 grams deionized (DI) water, 10 grams heptane and 0.05 grams tosylic acid. Add a mixture of 200 gram methyldichlorosilane and 10 gram trimethylchlorosilane dropwise into the reaction solution while stirring within 30 min. After one hour stirring at 23° C., wash the reaction solution 3 times with 50 mL DI water, dry with anhydrous sodium sulfate and filter through activated carbon layer. Remove volatiles by Rotovap to obtain the polymerization product $MD^{H}_{65}M$.

Test Methods

23° C. Gel Time. Prepare compositions and place in vials, seal the vials and store at 23° C. Invert the vials every minute for the first 10 minutes, then every 10 minutes for the first hour then every hour for the first 8 hours and then every 24 hours. Gel time at 23° C. is the time required for the composition to become sufficiently viscous so as to no longer flow within 1-2 of inverting the vial. During the test, the composition are open to ambient (including ultraviolet) light.

Hot Cure Time. Prepare compositions and coat as a 125 micrometer thick film on glassine paper. Place the films in an oven at the designated temperature and monitor at every 10 seconds for the first minute, then every minute for the first 10 minutes and then every 10 minutes from then on to determine when the film ceases to be tacky. The time required to cease being tacky is the Cure Time for the temperature at which it is being heated.

Compositions Using Cyclic Epoxides

Comparative Example (Comp Ex) A

Form a mixture by mixing $MD_{60.5}D^{HEP}_{7.5}M$, $MD^{H}_{65}M$ and 500 ppm (based on mixture weight) BCF (delivered as a 5 wt % solution in tetrahydrofuran) in a dental cup using a speedmixer at 23° C. The amount of $MD_{60.5}D^{HEP}_{7.5}M$ and $MD^{H}_{65}M$ provides a molar concentration ratio of SiH:EP that is 1.5:1. The mixture gelled within one minute after addition of BCF at 23° C.

Comp Ex A illustrate that epoxide and silyl hydrides react rapidly at 23° C. in the presence of a Lewis acid. They are clearly not shelf stable reactive compositions.

Example (Ex) 1: $MD_{60.5}D^{HEP}+MD^{H}_{65}M$+B-FLP(1)

Repeat Comp Ex A, except instead of 500 ppm BCF, use 500 ppm B-FLP(1). The composition (Ex 1) has a 23° C. gel time of 20 minutes and a 95° C. cure time of 0.2 minutes. Ex 1 illustrates that the B-FLP dramatically delays gelling at 23° C. while providing rapid cure at 95° C.

Ex 2: $Md_{117}D^{Hep}_{11.8}M+Md^{H}_{65}M$+B-Flp(1)

Repeat Ex 1, except use $MD_{117}D^{HEP}_{11.8}M$ instead of $MD_{60.5}D^{HEP}_{7.5}M$. The composition (Ex 2) has a 23° C. gel time of 2 hours and a 95° C. cure time of 0.2 minutes. Ex 2 illustrates the B-FLP dramatically delays gelling at 23° C. while providing rapid cure at 95° C.

Ex 3: $M^{Hep}D_{40}M^{Hep}+Md^{H}_{65}M$+B-Flp(1)

Repeat Ex 1, except use $M^{HEP}D_{40}M^{HEP}$ instead of $MD_{60.5}D^{HEP}_{7.5}M$. The composition (Ex 3) has a 23° C. gel time of 3 hours and a 95° C. cure time of 0.5 minutes. Ex 3 illustrates the B-FLP dramatically delays gelling at 23° C. while providing rapid cure at 95° C.

Ex 4: $Md_{60.5}D^{Hep}+Md^{H}_{65}M$+B-Flp(2)

Repeat Ex 1, except use B-FLP(2) instead of B-FLP(1). The composition (Ex 4) has a 23° C. gel time of over 4 days, a 95° C. cure time of over 60 minutes and a 215° C. cure time of 2 minutes. Ex 4 illustrates the B-FLP dramatically delays gelling at 23° C. while providing rapid cure at 215° C. Ex 4 also illustrates that different bridging groups in the B-FLP can govern at what temperature rapid curing occurs. The bridging group in B-FLP(2) releases the Lewis acid (BCF) at a higher temperature than the bridging group in B-FLP(1) as is evident by the need to heat to a higher temperature to achieve rapid cure.

Ex 5: $Md_{117}D^{Hep}_{11.8}M+Md^{H}_{65}M$+B-Flp(2)

Repeat Ex 2, except use B-FLP(2) instead of B-FLP(1). The composition (Ex 5) has a 23° C. gel time of over 4 days, a 95° C. cure time of over 60 minutes and a 215° C. cure time of 8 minutes. Ex 5 illustrates the B-FLP dramatically delays gelling at 23° C. while providing rapid cure at 215° C. Ex 5 also illustrates that different bridging groups in the B-FLP can govern at what temperature rapid curing occurs. The bridging group in B-FLP(2) releases the Lewis acid (BCF) at a higher temperature than the bridging group in B-FLP(1) as is evident by the need to heat to a higher temperature to achieve rapid cure.

Compositions Using Linear Epoxides

Comp Ex B

Repeat Comp Ex A except use $MD_{60.5}D^{EP}_{7.5}M$ instead of $MD_{60.5}D^{HEP}_{7.5}M$. The mixture gelled within 45 minutes after addition of BCF at 23° C.

Comp Ex B illustrates that linear epoxides and silyl hydrides react at 23° C. in the presence of a Lewis acid, but not as rapidly as the cyclic epoxide material of Comp Ex A, but still within one hour. As a result, Comp Ex B is not considered shelf stable.

Ex 6: $Md_{60.5}D^{Ep}+Md^H{}_{65}M+B\text{-Flp}(1)$

Repeat Comp Ex B except use B-FLP(1) instead of BCF. The composition (Ex 6) has a 23° C. gel time of over 4 days, a 95° C. cure time of 20 minutes and a 150° C. cure time of 0.5 minutes. Ex 6 illustrates that the B-FLP dramatically delays gelling at 23° C. while providing rapid cure at 95° C. and even more rapid cure at 150° C.

What is claimed is:

1. A composition comprising a mixture of silyl hydride, an epoxide and a Bridged Frustrated Lewis Pair.

2. The composition of claim 1, wherein the Bridged Frustrated Lewis Pair comprises:
   (a) a Lewis acid selected from a group consisting of aluminum alkyls, aluminum aryls, fluorinated aryl borane, boron halides, aluminum halides, gallium alkyls, gallium aryls, gallium halides, silylium cations and phosphonium cations;
   (b) a Lewis base selected from a group consisting of molecules having the following structures: $PR_3$, $P(NR_2)_3$, $NR_3$, $N(SiR_3)xR_{3-x}$, $RC(NR)N$, $P(N\text{—}R)R_3$ and

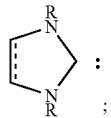

and
   where R is in each occurrence independently selected from a group consisting of hydrogen, alkyl, substituted alkyl, aryl and substituted aryl; and
   (c) a bridging molecule connecting the Lewis acid and Lewis base, the bridging molecule selected from a group consisting of carbon dioxide, $H_2$, nitriles, alkenes, alkynes, ketones, esters and aldehydes.

3. The composition of claim 2, wherein the Lewis acid is a fluorinated aryl borane.

4. The composition of claim 2, wherein the Lewis base is selected from a group consisting of $PR_3$, $NR_3$, guanidines, amidines and phosphazenes.

5. The composition of claim 2, wherein the bridging molecule is selected from a group consisting of carbon dioxide, nitrile, $H_2$, alkynes and alkenes.

6. The composition of claim 2, wherein the Lewis acid is a fluorinated aryl borane, the Lewis base is selected from a group consisting of $PR_3$ and $NR_3$ and the bridging molecule is selected from a group consisting of carbon dioxide and nitriles; where R is in each occurrence independently selected from a group consisting of hydrogen, alkyl, substituted alkyl, aryl and substituted aryl.

7. The composition of claim 1, wherein the composition is free of transition metals.

8. A hydrosilylation process comprising the steps of:
   (a) providing a composition comprising a mixture of silyl hydride, an epoxide and a Bridged Frustrated Lewis Pair; and
   (b) heating the composition to a temperature sufficient to dissociate the Lewis acid from the Bridged Frustrated Lewis Pair.

9. The process of claim 8, wherein step (a) comprises mixing together a Bridged Frustrated Lewis Pair, a silyl hydride and an epoxide.

10. The process of claim 8, wherein after step (a) and prior to step (b) the composition is applied to a substrate or placed in a mold.

11. The process of claim 9, wherein after step (a) and prior to step (b) the composition is applied to a substrate or placed in a mold.

12. The composition of claim 3, wherein the Lewis base is selected from a group consisting of $PR_3$, $NR_3$, guanidines, amidines and phosphazenes.

13. The composition of claim 3, wherein the bridging molecule is selected from a group consisting of carbon dioxide, nitrile, $H_2$, alkynes and alkenes.

14. The composition of claim 4, wherein the bridging molecule is selected from a group consisting of carbon dioxide, nitrile, $H_2$, alkynes and alkenes.

15. The composition of claim 2, wherein the composition is free of transition metals.

16. The composition of claim 3, wherein the composition is free of transition metals.

17. The composition of claim 4, wherein the composition is free of transition metals.

18. The composition of claim 5, wherein the composition is free of transition metals.

19. The composition of claim 6, wherein the composition is free of transition metals.

* * * * *